United States Patent [19]
Rowland

[11] B 3,992,080
[45] Nov. 16, 1976

[54] RETROREFLECTIVE SHEET MATERIAL WITH CONTROLLED STRETCH AND METHOD OF MAKING SAME

[75] Inventor: William P. Rowland, Southington, Conn.

[73] Assignee: Reflexite Corporation, New Britain, Conn.

[22] Filed: June 13, 1975

[21] Appl. No.: 586,663

[44] Published under the second Trial Voluntary Protest Program on February 3, 1976 as document No. B 586,663.

[52] U.S. Cl. .................................. 350/103; 264/1
[51] Int. Cl.² ........................................ G02B 5/124
[58] Field of Search .......................... 350/103, 167; 308/DIG. 7; 15/415, 300 A; 264/1

[56] References Cited
UNITED STATES PATENTS

| | | | |
|---|---|---|---|
| 2,731,068 | 9/1950 | Richards | 308/DIG. 7 |
| 3,173,164 | 3/1965 | Congdon | 15/300 A |
| 3,357,772 | 2/1963 | Rowland | 350/167 |
| 3,357,773 | 12/1964 | Rowland | 350/167 |
| 3,636,147 | 1/1972 | Rowland | 264/1 |
| 3,741,623 | 6/1973 | Milalik | 350/103 |

*Primary Examiner*—Alfred E. Smith
*Assistant Examiner*—B. Wm. delos Reyes

[57] ABSTRACT

A composite retroreflective sheet material with controlled stretch is provided by a strip of transparent retroreflective snythetic resin having cube corner formations on one surface thereof bonded to a longitudinally stretched flexible strip of backing material with the cube corners thereadjacent. The composite sheet material is puckered when in a relaxed state and is stretchable on a support surface with the elimination of the puckered condition indicating the proper degree of elongation without distortion of the cube corners. The backing material is stretched 3 - 15% at the time of bonding, and bonding is conveniently only along the longitudinal edges of the two strips. The exposed surface of the backing material may have a high friction or adhesive coating, and the faces of the cube corner formations may have a reflective coating.

5 Claims, 5 Drawing Figures

RETROREFLECTIVE SHEET MATERIAL WITH CONTROLLED STRETCH AND METHOD OF MAKING SAME

BACKGROUND OF THE INVENTION

Retroreflective materials, i.e., those which reflect a predominant portion of the light incident thereon substantially parallel to the incident light back toward the source, are commonly used for safety purposes in highway markers, vehicle reflectors, and the like. In such retroreflective materials comprising a multiplicity of cube corners, the orthogonality of the faces forming the cube corners must be maintained precisely or the retroreflective properties are greatly diminished. It is possible to control advantageously the angular divergence of the retroreflected light by varying the interface dihedral angles of the cube corners, but random distortion thereof generally results in unwanted loss of brightness.

An object of U.S. Pat. No. 3,684,348 for "Retroreflective Material," granted Aug. 15, 1972, was to provide a flexible retroreflective sheet material utilizing cube corners which would conform and adhere to nonplanar support surfaces. While this retroreflective material has functioned very well, it has been found that, if stretched during application to a support surface, such as wrapping a tape made therefrom helically around bicycle handlebars, the cube corners are distorted. This renders the cube corner faces non-orthogonal to a degree resulting in significant loss of brightness.

Accordingly, it is an object of the present invention to provide a novel strechable retroreflective sheet material utilizing cube corner retroreflectors which is easily applied under tension to support surfaces and provides good retroreflection when stretched a predetermined amount.

It is also an object to provide such retroreflective material with a high friction or adhesive coating by which it may be conveniently held against slippage on a support surface.

Another object is to provide such retroreflective material wherein the tension used to stretch the material about the support surface while avoiding distortions of the cube corner formations is readily determined during application to the support surface.

Still another object is to provide a novel method for manufacturing such retroreflective material which is relatively simple and economical and which facilitates the establishment of a visual gauge for the stretching tension desired during application thereof to a support surface.

SUMMARY OF THE INVENTION

It has now been found that the foregoing and related objects of the present invention are readily attained in an elongated composite retroreflective sheet material with controlled stretch comprising a first strip of transparent flexible synthetic resin having a multiplicity of minute cube corner formations on one surface thereof bonded to a second strip of flexible backing material of lesser length than the first strip when in a relaxed condition with the cube corner formations disposed adjacent the second strip. The composite retroreflective sheet material is puckered in the relaxed condition thereof, and is stretchable to a smooth surface condition with the elimination of the puckered condition providing a visual measurement of the desired degree of elongation of the composite material to avoid distortion of the cube corner formations.

In a preferred embodiment, the cube corner formations have a reflective coating on the faces thereof and the exposed surface of the second strip has a high friction or adhesive coating thereon. The strips are bonded along the longitudinal edges thereof and may also be bonded transversely at spaced points along the length thereof. The length of the second strip is 3 – 15% less than that of the first strip in the relaxed condition of the composite material.

Further objects of the invention are readily attained in a method for making composite retroreflective sheet material having controlled stretch wherein a transparent flexible strip of retroreflective material is formed having a multiplicity of minute cube corner formations on one surface thereof. A strip of flexible backing material is stretched longitudinally a predetermined amount and substantially uniformly and bonded to the strip of retroreflective material with the cube corner formations thereadjacent while maintaining the strip of backing material in a predetermined stretched condition. The resultant composite retroreflective sheet material assumes a puckered configuration upon release of the stretching force.

In its preferred aspect, the method of the present invention includes the additional step of coating the exposed surface of the strip of backing material with a high friction material or adhesive. A reflective coating is deposited on the faces of the cube corner formations. The strip of backing material is stretched 3 – 15% longitudinally during bonding, which extends along the longitudinal edges of the strips. A handlebar is helically wrapped with a strip of the composite retroreflective sheet material.

DETAILED DESCRIPTION OF THE ILLUSTRATED EMBODIMENT

Figure 1:
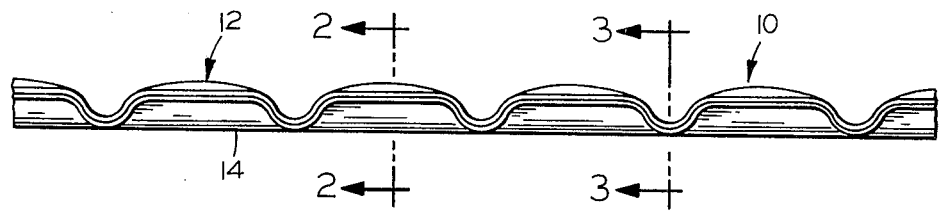
FIG. 1 is a fragmentary side elevational view of composite retroreflective sheet material embodying the present invention.
Figure 2:
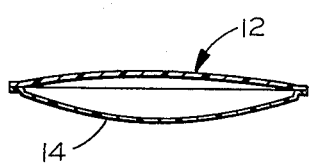
FIG. 2 is a sectional view along the line 2—2 of FIG. 1.
Figure 3:
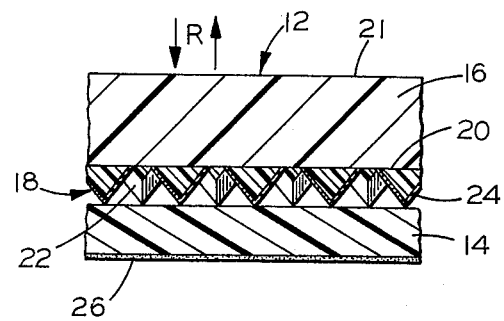
FIG. 3 is a fragementary sectional view along the line 3—3 of FIG. 1 and drawn to an enlarged scale with the thickness of the component layers out of proportion for clarity of illustration.

Turning now to the attached drawing in detail, illustrated in FIGS. 1–3 thereof is a composite retroreflective sheet material embodying the present invention generally designated by the numeral 10. A retroreflective strip of transparent flexible synthetic resin generally designated by the numeral 12 is bonded along its longitudinal edges to a stretched backing strip 14 of opaque flexible synthetic resin. As shown in FIG. 1, the composite retroreflective sheet material 10 is puckered when in a relaxed condition.

As best seen in FIG. 3, the retroreflective strip 12 comprises a body portion 16 and a multiplicity of contiguous cube corner retroreflecting formations generally designated by the numeral 18 projecting from the surface 20 thereof, each cube corner 18 having three orthogonal faces 22. The vertices of the cube corner formations 16 are in contact with the backing strip 14 when the composite retroreflective sheet 10 is stretched a predetermined amount, although, in the relaxed puckered condition seen in FIG. 2, portions of the two strips 12, 14 along their length assume an arcuate configuration and are spaced apart. The backing strip 14 has a high friction or adhesive coating 26 thereon to minimize slippage of the composite retroreflective sheet material 10 to a support surface during application and thereafter prevent relative slippage therebetween.

The arrows R in FIG. 3 indicate generally the path incident and reflected light rays follow during retroreflection. Incident rays enter the retroreflective strip 12 through the outer or front surface 21 thereof and are reflected by the cube corner formations 18 back substantially parallel to the path of entry. Normally, the air interface at the cube corner formations 18 will be relied upon for retroreflection of the light rays, although a portion of the rays that strike the interface at less than the critical angle will pass therethrough. To enhance retroreflection in the configuration having an air interface or that where the backing strip 14 abuts the cube corner formations 18 or an adhesive (not shown) is disposed intermediate the strips 12, 14, the cube corner formations may have a reflective coating 24 thereon.

Detailed information regarding the structure and composition of the retroreflective strip 12 is disclosed in the hereinbefore mentioned U.S. Pat. No. 3,864,348. Briefly, precise cube corner formations 18 of transparent synthetic resin are molded or cast onto a flat surface 20 of a flexible body portion 16 formed also of a transparent synthetic resin. The precision of the orthogonality of the cube corner faces 22 principally determines the angular dispersion or refraction of the retroreflected light.

Figure 5:
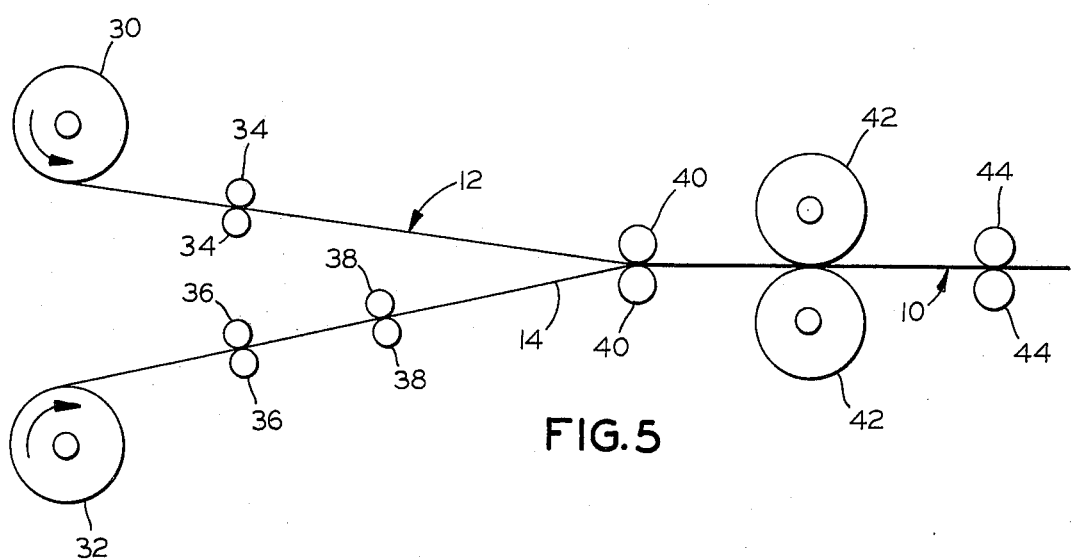
FIG. 5 is a schematic view of the apparatus employed in the method for making composite retroreflective sheet material embodying the present invention.

The apparatus used in the method of laminating the strips 12, 14 is shown schematically in FIG. 5. Two sets of draw rolls 34, 36 firmly engage the strips 12, 14 and pull them from their supply rolls 30, 32 of retroreflective strip 12 and backing strip 14 respectively. The draw rolls 38 rotate at the same rate as the draw rolls 34 and faster than the draw rolls 36 to stretch the backing strip 14 a predetermined amount as it passes therebetween. While maintaining the backing strip 14 under a predetermined amount of stretch, the strips 12, 14 are brought into contact in the nip of the pinch rolls 40, pass between the bonding rolls 42, and are drawn therefrom by the rolls 44. The rolls 34, 38, 40, 42, 44 all rotate at the same rate so that the elongation of the backing strip 14 is easily controlled by the slower rate of rotation of the draw rolls 36 and the retroreflective strip 12 undergoes no distorting stresses during lamination.

During application to a support surface the composite retroreflective sheet material 10 is stretched an amount just sufficient to eliminate the puckered condition and assure intimate contact with the support surface, thus providing a visual measurement of the desired degree of elongation. Excessive stretching will result in distortion of the cube corner formations 18 and a corresponding loss of brightness.

Figure 4:
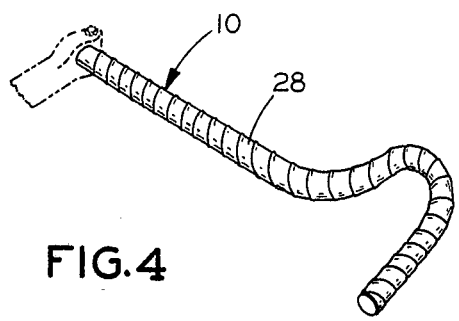
FIG. 4 is a fragmentary perspective view of conventional cycle handlebars wrapped with retroreflective material of the present invention.

The composite retroreflective sheet material 10 is generally formed as strips of tape, FIG. 4 illustrating one use therefor wherein a cycle handlebar 28 is helically wrapped therewith so that each turn slightly overlaps the previous turn. The high friction or adhesive coating 26 thus securely engages the handlebar 28 and the overlapped portions of the retroreflective sheet material 10 to prevent slippage of the sheet material or tape 10. It has proven more effective to use a high friction rather than adhesive coating where there is a chance of misaligning the sheet material or tape 10 during application, as removal thereof from a support surface is facilated.

Various synthetic resins may be employed for the cube corner formations, the body portion, and the backing strip, including polymers of (alk) acrylic acid esters such as polymethyl methacrylate and polybutyl acrylate; cellulose esters such as cellulose acetate, cellulose acetate/butyrate copolymers and cellulose proprionate; vinyl halides such as polyviny chloride and polyvinyl fluoride; vinylidene aromatic hydrocarbon polymers such as polystyrene and styrene/acrylonitrile copolymers; ethylenically unsaturated nitriles such as polyacrylonitrile; polycarbones; polyesters such as polyethylene terephthalate; polyphenylene oxide; polysulfones; and polyolefins such as polyethylene and polypropylene. Interpolymers of various of the several above mentioned types of monomers, e.g., vinyl chloride/vinyl acetate copolymers, may also be employed as may be mixtures of polymers. The particular resin formulations selected for the components of the composite structure will vary depending upon the application, the thickness desired for the body member and backing strip, the desire for flexibility, and need for achieving interadhesion between the cube corner formations and body member. For outdoor applications, materials which are moisture resistant, ultraviolet resistant and abrasion resistant are particularly advantageously employed at least for the body portion and backing strip since those portions are generally exposed to the atmosphere and require good weathering characteristics. Moreover, it will be appreciated that the body portion or backing strip may be a composite of two different synthetic resins.

The resins preferably employed for the body portion and backing strip include polyvinyl halides, polyethylene terephthalate, polyvinylidene chloride, polycarbonates, polysulfones and cellulose ester polymers. The resins preferably employed for the cube corner formations comprise (alk) acrylic acid ester resins, acrylic-modified vinyl chloride resins, vinyl chloride/vinyl acetate copolymers, ethylenically unsaturated nitrile resins, monovinylidene aromatic hydrocarbon resins, olefin resins, cellulose ester resins, polysulfone resins, polyphenylene oxide resins and polycarbonates. Exemplary combinations for the body portion cube corner formations include polyvinyl chloride/acrylic modified polyvinyl chloride; polyvinyl fluoride/polyvinyl chloride; polycarbonate/polycarbonate; polyvinyl/chloride polymethyl methacrylate; polysulfonelpolymethyl methacrylate; polysulfone/polyvinyl chloride; and polyethylene terephthalate/polymethyl methacrylate.

The reflective coating on the faces of the cube corner formations is conveniently provided by metallizing techniques such as those wherein a very thin film of aluminum or other metal is deposited on the surface by vaporization thereof at very low subatmospheric pressures. Chemical deposition techniques may also be used to produce a reflective metallic coating. Another technique for achieving reflective coatings is to utilize a lacquer containing metallic particles or other pigments affording a high degree of reflectivity; for example, pearl lacquers may be employed. In still another technique, the reflective coating may be provided by a metallized synthetic plastic film which is brought into intimate contact with the surface of the cube corner formations.

As indicated previously, the exposed surface of the backing strip preferably has a high friction or adhesive coating, although the surface may be roughened or embossed to provide such an effect. Exemplary of a satisfactory high friction coating material used is a semi-reactive acrylic emulsion such as that sold under the trademark RHOPLEX B 15 by Rohm and Haas. Although various types of adhesives may be employed for the coating on the backing strip, ever tacky adhesives of the type conveniently used in the manufacture of pressure sensitive tapes have proven particularly advantageous. These adhesives may be applied either in solvent systems or as aqueous emulsions, depending upon the particular resin forming the base thereof. When an adhesive is employed, in order to facilitate handling and shipping, a readily releasable sheet material is applied over the surface of the adhesive, conveniently of the coated paper-type referred to in the industry as "release paper." However, other forms of sheet material including synthetic plastic films may be employed therefor so long as they exhibit a low degree of adhesion to the adhesive coating to facilitate stripping therefrom without removal of the adhesive coating from the composite material.

The retroreflective and backing strips may be bonded by heat sealing, ultrasonic welding, solvent sealings or adhesives. If adhesives are used along the entire interface instead of at the longitudinal edges only, they must be selected so that the cube corner/adhesive interface permits efficient retroreflection and be highly flexible to permit the necessary distortions of the two strips in the relaxed condition of the composition sheet material. As described hereinbefore, a reflective coating on the cube corner faces effectively eliminates this problem.

Thus, it can be seen from the foregoing specification and drawing that the present invention provides a novel stretchable retroreflective sheet material utilizing cube corner retroreflective formations which is easily applied under tension to support surfaces and provides good retroreflection when stretched a predetermined amount. The retroreflective sheet material may have a high friction or adhesive coating by which it may be conveniently held against slippage on a support surface. The tension used to stretch the material about a support surface while avoiding distortion of the cube corner formations is readily determined during application to the support surface. The method for manufacturing the material is relatively simple and economical and facilitates the establishment of a visual gauge for the stretching tension desired during application thereof to a support surface.

Having thus described the invention, I claim:

1. An elongated composite retroreflective sheet material with controlled stretch comprising a first strip of transparent flexible synthetic resin having a multiplicity of minute cube corner formations on one surface thereof and a second strip of flexible backing material of lesser length than said first strip when in a relaxed condition and bonded to said first strip with said cube corner formations disposed adjacent said second strip, said composite retroreflective sheet material being puckered in the relaxed condition thereof, and stretchable to a smooth surface condition with the elimination of the puckered condition providing a visual measurement of the desired degree of elongation of the composite material to avoid distortion of the cube corner formations said strips being bonded along the longitudinal edges thereof.

2. The composite retroreflective sheet material of claim 1 wherein said cube corner formations have a reflective coating on the faces thereof.

3. The composite retroreflective sheet material of claim 1 wherein the exposed surface of said second strip has a coating of high friction material thereon.

4. The composite retroreflective sheet material of claim 1 wherein the exposed surface of said second strip has an adhesive coating thereon.

5. The composite retroreflective sheet material of claim 1 wherein said length of said second strip is 3 – 15% less than that of said first strip in the relaxed condition of said composite material.

* * * * *